(12) United States Patent
Côté et al.

(10) Patent No.: US 6,952,211 B1
(45) Date of Patent: Oct. 4, 2005

(54) MOTION COMPENSATION USING SHARED RESOURCES OF A GRAPHICS PROCESSOR UNIT

(75) Inventors: Jean-Francois Côté, Boucherville (CA); Jean-Jacques Ostiguy, Montreal (CA)

(73) Assignee: Matrox Graphics Inc., Dorval (CA)

( * ) Notice: Subject to any disclaimer, the term of this patent is extended or adjusted under 35 U.S.C. 154(b) by 321 days.

(21) Appl. No.: 10/290,331

(22) Filed: Nov. 8, 2002

(51) Int. Cl.[7] ............................................. G06T 15/70
(52) U.S. Cl. .................. 345/473; 375/240.16
(58) Field of Search ............................. 345/473, 503; 375/240.16

(56) References Cited

U.S. PATENT DOCUMENTS 5,977,997 A * 11/1999 Vainsencher ................ 345/519
6,208,350 B1 * 3/2001 Herrera ....................... 345/582
6,538,658 B1 * 3/2003 Herrera ....................... 345/582
6,621,490 B1 * 9/2003 Frank et al. ................. 345/418

* cited by examiner

Primary Examiner—Almis R. Jankus
Assistant Examiner—Jon Hadidi
(74) Attorney, Agent, or Firm—Ogilvy Renault LLP

(57) ABSTRACT

A method of motion compensation within a displayable video stream using shared resources of a Graphics Processor Unit (GPU). Image data including a sequential series of image frames is recieved. Each frame includes any one or more: frame-type; image texture; and motion vector information. At least a current image frame in analysed, and the shared resources of the GPU are controlled to generate a motion compensated image frame corresponding to the current image frame, using one or more GPU commands.

20 Claims, 10 Drawing Sheets

MOTION COMPENSATION USING SHARED RESOURCES OF A GRAPHICS PROCESSOR UNIT

CROSS-REFERENCE TO RELATED APPLICATIONS

This is the first application filed for the present invention.

MICROFICHE APPENDIX

Not Applicable.

TECHNICAL FIELD

The present invention relates to digital video image processing systems, and in particular to a method of motion compensation using shared resources of a graphics processor unit.

BACKGROUND OF THE INVENTION

As is well known in the art, digital video image processing systems commonly rely on Moving Picture Experts Group (MPEG) standards for compressing and transmitting digital video images. These MPEG standards use discrete cosine transform (DCT) for encoding/compressing video images. DCT encoding produces a stream of coefficients, which are then quantized to produce digitized video image data that can be stored or transmitted. This process of discrete cosine transformation and quantization greatly reduces the amount of information needed to represent each frame of video. In order to reconstruct the original video image (e.g. for display), the encoding process is reversed. That is, the video image data is inverse quantized, and then processed using an inverse discrete cosine transform (IDCT).

However, during reconstruction of the video image, if there is not enough processing power to maintain the frame rate and perform IDCT, then a simplified IDCT is performed. This is typically accomplished by simply ignoring certain portions of the transform altogether, resulting in imperfect replication of the original image. Image quality will suffer, typically by loss of detail, and "blocking" (that is, square areas lacking in detail) within the displayed image.

A known method of reducing the amount of IDCT data that must be processed to reconstruct a video image is to implement a motion compensation technique during the encoding process. For example, consider an area of an image that moves, but does not change in detail. For such an area, much of IDCT data can be replaced by a motion vector. During subsequent reconstruction of the video image, a motion compensation algorithm applies the motion vector to a previous and/or next image to estimate the correct image data for the relevant portion of the display image. Digital image processing systems commonly rely on a host processor (e.g. the main CPU of a personal computer) to perform motion compensation processing when needed.

A difficulty with this technique is that it requires processing of multiple image frames (or fields) during reconstruction of the video image. This operation is computationally intensive and can impose an unacceptable burden on the resources of the host processor. If sufficient processing power is unavailable, various motion-compensation "artifacts" (e.g. choppy movements within the frame) become apparent to a person viewing the reconstructed image.

An alternative solution is to embed a single-purpose motion compensation engine (within the graphics processor unit (GPU)). This approach ensures that all video image processing can be performed independently of the host CPU. However, this solution consumes valuable "real-estate" on the GPU, which increases costs. In view of the limited use of the motion compensation engine, this increased cost is frequently considered to be unacceptable.

Accordingly, a system enabling shared resources of a GPU to perform motion compensation processing during the reconstruction of video images remains highly desirable.

SUMMARY OF THE INVENTION

Accordingly, an object of the present invention is to provide a method and system for controlling shared resources of a GPU to perform motion compensation processing, during the reconstruction of a video image.

An aspect of the present invention provides a method of motion compensation within a displayable video stream using shared resources of a Graphics Processor Unit (GPU). In accordance with the present invention, image data including a sequential series of image frames is received. Each frame includes any one or more: frame-type; image texture; and motion vector information. At least a current image frame in analyzed, and the shared resources of the GPU are controlled to generate a motion compensated image frame corresponding to the current image frame, using one or more GPU commands.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a method and system for performing motion compensation using shared resources of a graphics processor unit (GPU) of a digital image processing system. In order to facilitate understanding of the present invention, a description of conventional motion compensation in accordance with MPEG standards is presented below with reference to FIGS. 1 and 2.

As is well known in the art, three main types of frames are defined in the MPEG standard, namely: Intra coded frames (I-Frames); Predictive coded frames (P-Frames); and Bi-directionally predictive frames (B-Frames).

I-Frames are coded/decoded without reference to any other frame. This means that motion vectors do not play a role in the reconstruction of an I-Frame, which is accomplished solely on the basis of its IDCT data.

P-Frames are coded/decoded with reference to a previous frame. This means that IDCT data of the frame, in combination with motion vectors from a previous Intra or Predictive coded frame, are used in the reconstruction of a P-Frame.

Figure 1:
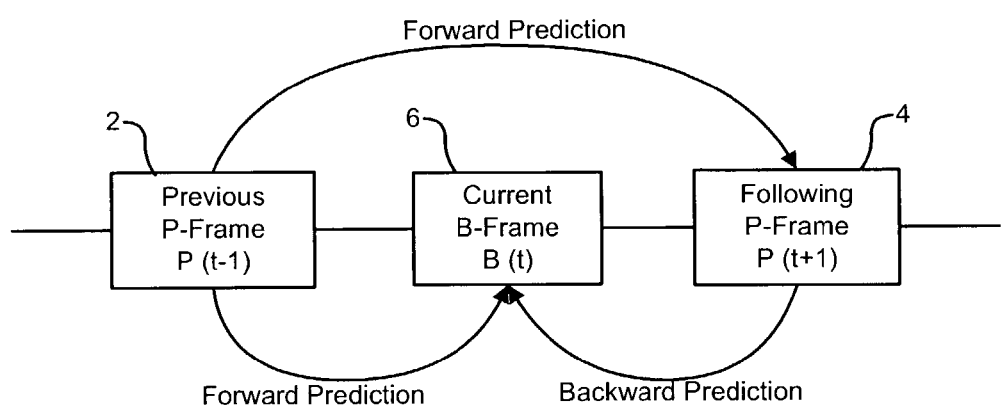
FIG. 1 is a simplified representation of conventional temporal frame processing.

B-Frames are coded/decoded with reference to motion vectors of both previous and following reference frames. This type of frame, however, does not contribute as a reference frame to any other future or past frame. FIG. 1 illustrates the process of creating a B-frame from two P-frames. IDCT data and motion vectors of a "previous" P-frame P(t−1) 2 is used to construct a "following" P-frame P(t+1) 4. The two P-frames P(t−1) and P(t+1) are then used to construct the "current" B-frame B(t) 6. In this respect, P-frame P(t−1) 2 contributes forward prediction data while P-frame P(t+1) 4 contributes backward prediction data.

Figure 2:
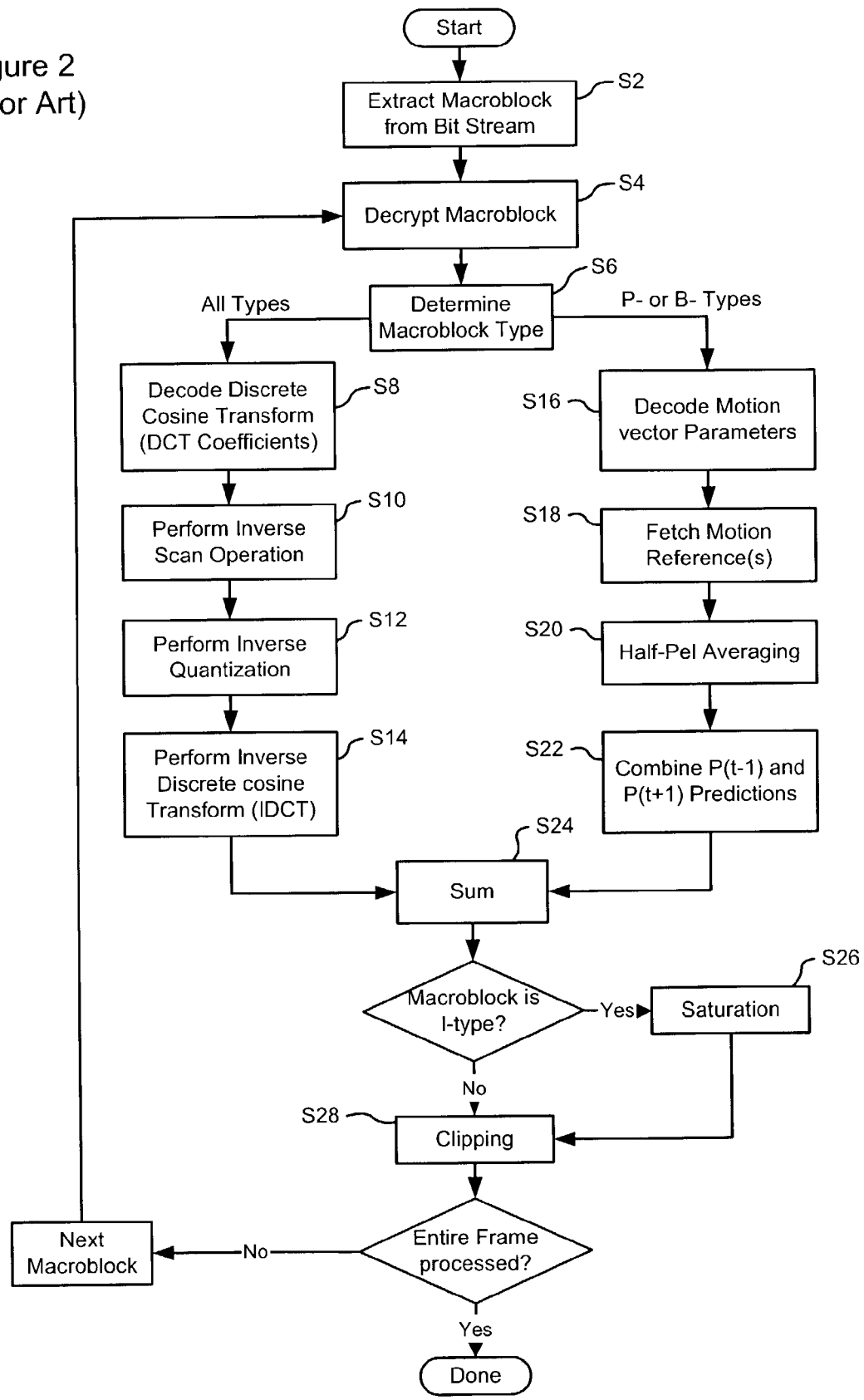
FIG. 2 is a flow chart showing principle steps in a conventional motion compensation process.

FIG. 2 is a flow chart illustrating the conventional process of decrypting and reconstructing a frame. In general, the motion compensation process is performed on a block-by-block basis, and each of the blocks assembled to form a complete frame. Up to four separate predictions can be formed for each block.

At step S2, a macroblock (e.g. representing a 16×16 block of pixels) of the frame is extracted from the encoded video bit stream, and decrypted (at S4). The type of macroblock is then determined (at S6), based on the frame type.

All macroblocks are decompressed (following the left-hand path in FIG. 2) regardless of the macroblock type. Thus at step S8, the macroblock is analysed to decode the discrete cosine transform coefficients. Then an inverse scan operation (at S10) is performed. The inverse scan results are inverse quantized (at S12), and then processed in accordance with the Inverse Discrete Cosine Transform (IDCT) at step S14.

For P- and B-type macroblocks, the processing path on the right hand side of FIG. 2 is also executed (either sequentially, or in parallel with the above-described decompression and IDCT processing of the macroblock, in steps S8–S14). Thus motion vectors embedded in the macroblock are decoded at step S16. The decoded motion vector parameters are then used to retrieve motion references relating to the current macroblock (at S18). Depending of the macroblock type, the motion references will comprise either: a previously reconstructed macroblock of previous P-frame P(t−1) 2 (if the current macroblock is a P-type); or previously reconstructed macroblocks of both previous P-frame P(t−1) and following P-frame P(t+1) (if the current macroblock is a B-type).

The motion references obtained from P(t−1) (and possibly P(t+1)) are then modified by respective half-pel prediction averaging (at S20). The resulting predictions are then combined (at S22), and the combination summed (at S24) with the IDCT coefficients calculated in step S14. If the current macroblock in question is of I-type, the summation result is saturated (e.g. by adding 128) at step S26. This result is then clipped (at S26) to obtain a value within an appropriate value range for display.

If the entire frame has been processed, then the frame reconstruction operation is complete. Otherwise, processing of the frame continues with the next macroblock.

The present invention provides a method and system for performing efficient motion compensation using shared resources of a Graphics Processor Unit (GPU). A preferred embodiment of the present invention is described below with reference to FIGS. 3–6.

Figure 3:
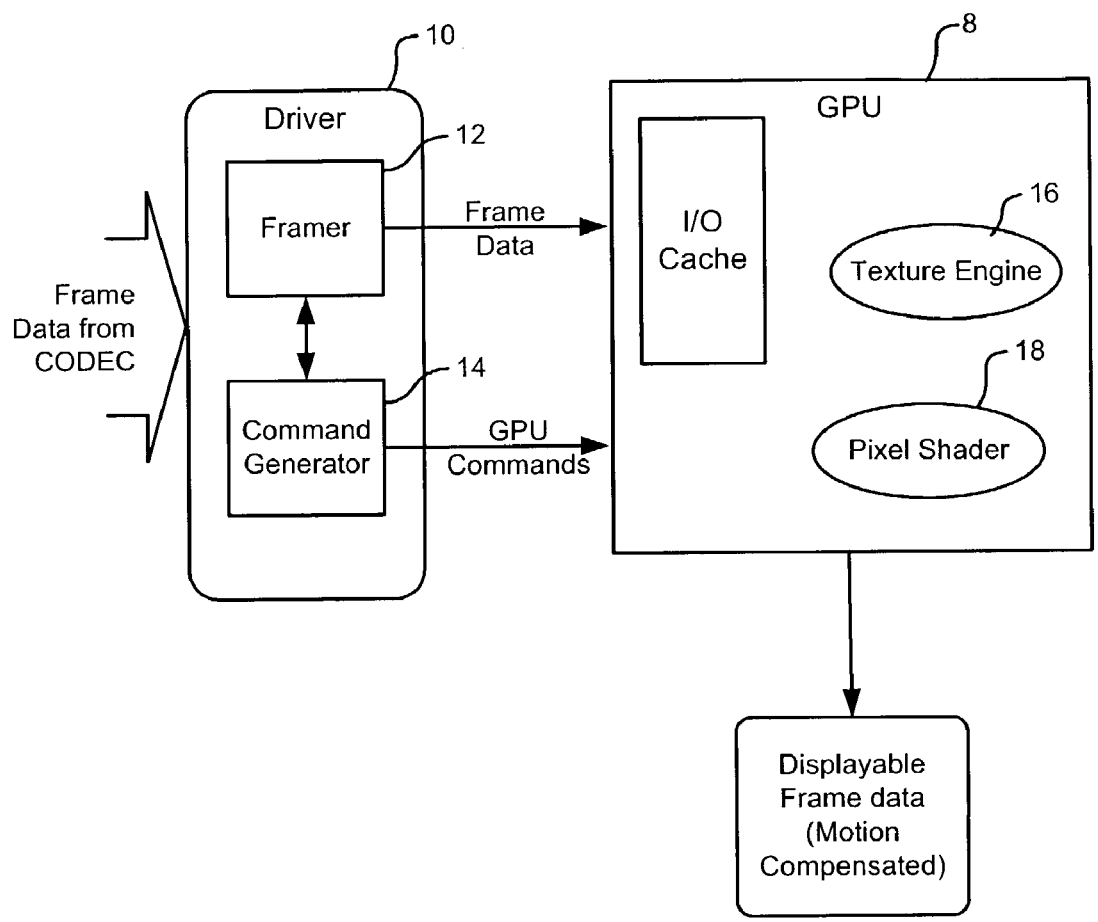
FIG. 3 is block diagram showing principle elements and operations of a system in accordance with an embodiment of the present invention.

FIG. 3 is a block diagram schematically illustrating principle elements and operations of a system in accordance with the present invention. As shown in FIG. 3, the present invention comprises a driver 10 defining a framer 12 and a command generator 14. In general, the driver 10 may be provided as software capable of interacting with the shared resources of the GPU 8 (FIG. 3). The primary shared resources of the GPU 8 utilized by the driver 10 for motion compensation include a texture engine 16 and a pixel shader 18. Texture engine 16 can be a conventional 3D texture engine as is well known in the art, in order to easily accommodate a normalized spatial co-ordinate system. Other resources used for motion compensation include input/output cache and buffers, as well as off-chip RAM (not shown) located separately from (but connected to) the GPU 8. All of these elements are normally provided in (and/or associate with) a conventional GPU 8, and used for rendering most types of graphical images on a display. In general, the physical design of the GPU 8, and its installation with a digital image processing system, can be entirely conventional. In some cases, modifications of the GPU 8 may be desirable in order to expand its Application Program Interface (API) to optimize its responsiveness to the command generator 14, and so improve motion compensation. It is expected that those skilled in the art will fully appreciate the desirability, nature and scope of any such modifications, based on the following description of preferred embodiments.

It is estimated that utilization of shared resources of the GPU 8 for motion compensation, in accordance with the present invention, will consume approximately 25% of the processing bandwidth of a typical CPU. Thus no modifications need be made to implement the methods of the present invention. However, in some cases it may be considered desirable to increase the processing bandwidth of the CPU and/or GPU 8, to optimize performance. It is considered that any such modifications are well within the purview of those skilled in the art, and thus are not described in detail herein.

In general, the framer 12 is designed to receive decrypted frame data from a conventional CODEC (not shown). The framer 12 operates to convert the image data of the frame into normalized spatial coordinates (i.e. u, v) appropriate for display, and analyses the frame to determine its type (i.e. I, P or B) and field format (if any). The Command generator 14 uses this information to generate appropriate GPU commands for controlling the operation of one or more shared resources of the GPU 8 to perform motion compensation.

Figure 4:
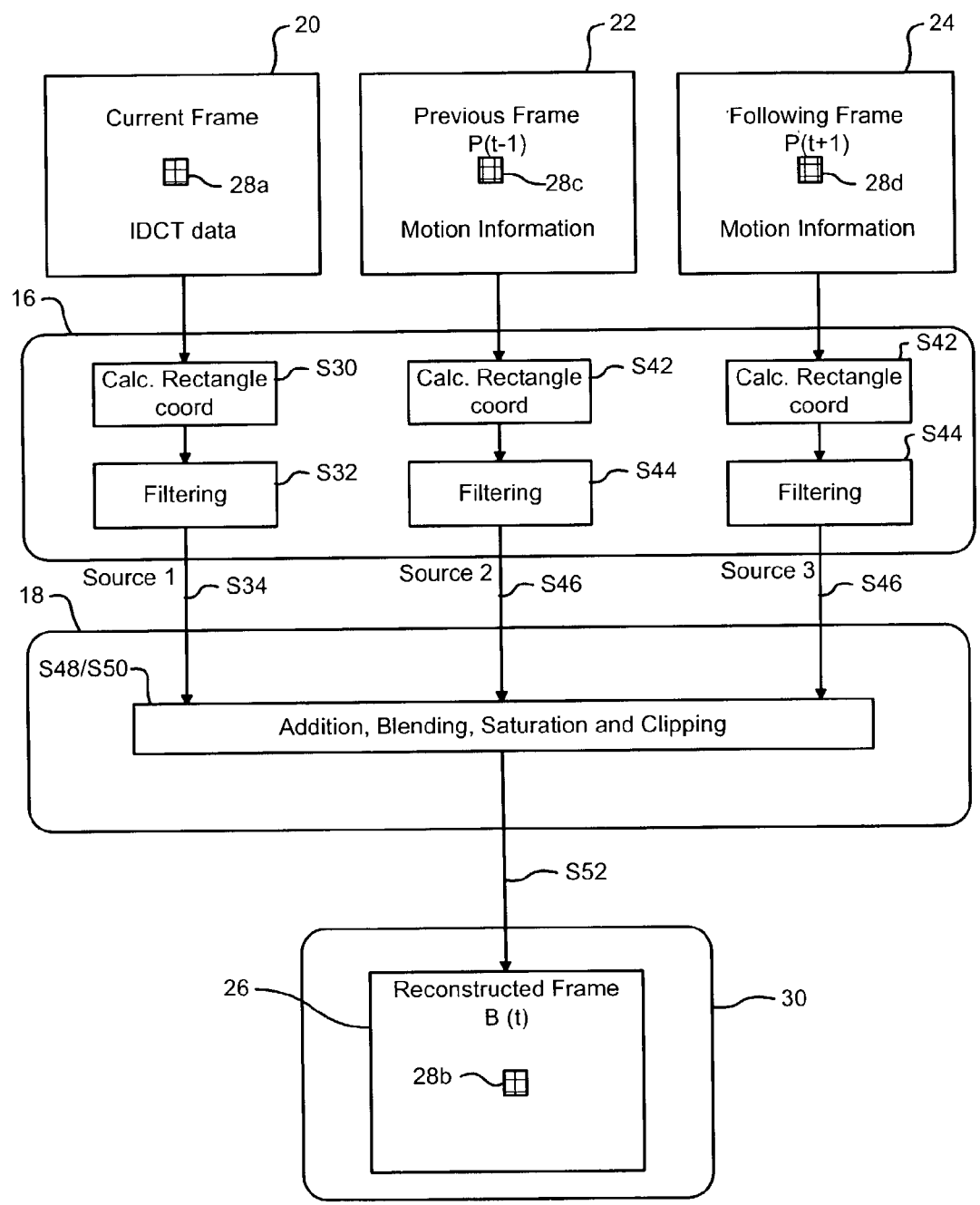
FIG. 4 is a flow chart showing principle steps in a motion compensation process in accordance with an embodiment of the present invention.

FIG. 4 illustrates principle operations performed by the shared resources of the GPU 8, under control of the driver 10, to generate a (motion compensated) reconstructed frame 30 corresponding to a current frame 20, 22 and 24. In general, generation of reconstructed frame 26 is performed by separating the input frames 20, 22 and 24 into a plurality of macroblocks 28 (each of which covers, for example, 16×16 block of pixels), which are then processed sequentially. The processed macroblocks 28 are written to memory 30 to assemble the reconstructed frame 26. Thus each macroblock 28 of the current frame 20 is sampled using the texture engine 16. The sampled macroblocks are then added, saturated and clipped (as required) using the pixel shader 18. Each macroblock 28 is then written to a respective location in memory 30, which is selected to facilitate assembly of the reconstructed frame 26, in preparation for display. These processes are described in greater detail below.

Figure 5A:
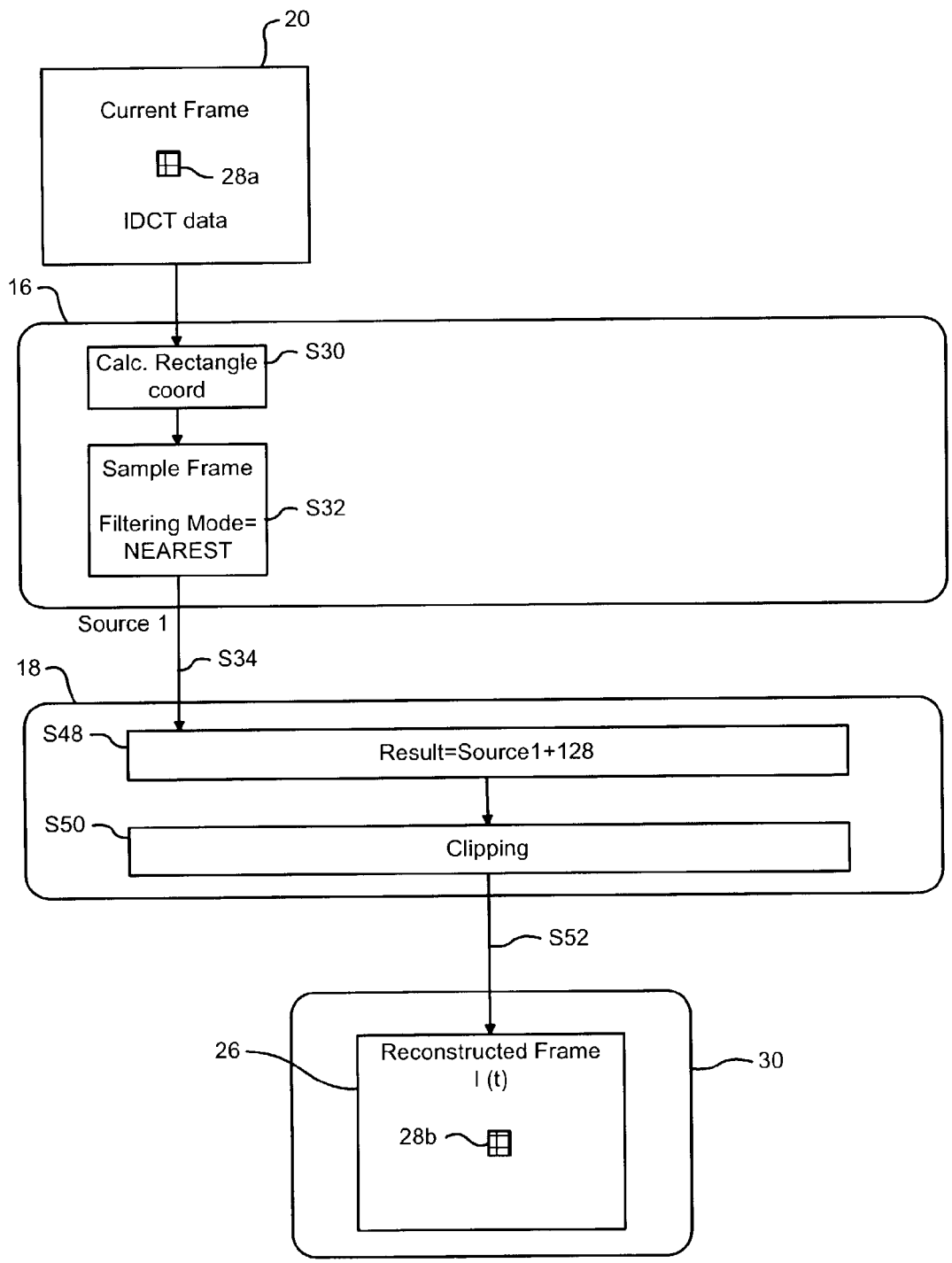
FIGS. 5a–d show principle steps in a motion compensation process for I, P and B blocks in accordance with an embodiment of the present invention.

As shown in FIG. 5a, an I-block is reconstructed independently of motion vector information of the previous or following frame. Hence only the frame 20 blocks are used. At a first step S30, rectangle coordinates are calculated for a macroblock 28a in the current frame 20. Each macroblock 28 has an index number N (typically starting at 0), which serves as an offset (relative to the first macroblock of the frame) from which the IDCT data of the current frame 20, is sampled. The x,y coordinates of each macroblock 26 is calculated using equations 1 and 2 below (assuming that a macroblock has a width of 16 pixels):

$$x = int(N\%(frame\_width/16))*16 \quad (eq. 1)$$

$$y = int(N/(frame\_width/16))*16 \quad (eq. 2)$$

These x,y values provide the coordinate values of the involved macroblock 28a in both the current (IDCT) frame 20 and the reconstructed frame 26. Based on these x,y coordinate values, normalized coordinates (u,v) within the image (frame) can be calculated for the current and reconstructed frames 20 and 26 as follows:

$$u \text{ offset} = float(x/frame\_width) \quad (eq. 3)$$

$$v \text{ offset} = float(y/frame\_height) \quad (eq. 4)$$

The rectangle coordinates for the current and reconstructed frames 20 and 26 can then be calculated using equations 5–7 below:

$$\text{upper left} = (u,v) \quad (eq. 5)$$

$$\text{upper right} = (u+macrobloc\_width/frame\_width, v) \quad (eq. 6)$$

$$\text{lower left} = (u, v+macrobloc\_height/frame\_width) \quad (eq. 7)$$

$$\text{lower right} = (u+macrobloc\_width/frame\_width, v+macrobloc\_height/frame\_width) \quad (eq. 8)$$

These coordinates define the rectangle within which the image data of the frame 20 is sampled to obtain the content of the involved macroblock. Following calculation of rectangle coordinates, the IDCT (image texture) information of the current frame 20 is sampled using a "nearest" filter (at step S32), which by definition has single-pel precision. The macroblock 28a (now containing sampled image data) is forwarded (at S34) to the pixel shader 18 for further processing.

The macroblock 28a (forwarded from the texture engine 16 at S34) is saturated (at S48) in a conventional manner. The saturated macroblock data result is then clipped (at S50), again in a conventional manner, to provide a valid color range (e.g. of 16–240) of the reconstructed macroblock 28b. The pixel shader 18 then writes the reconstructed macroblock 28b to memory 30 (at S50) using the x,y coordinates calculated above to assemble the reconstructed frame 26, in displayable format, within memory 30.

As is well known in the art, the input frame 20, may be different than a x,y texture, it could also be in the form of a linear texture. In this case the u,v coordinates are calculated using the following equations:

$$u \text{ offset} = float (linear\_address/surface\_length) \quad (eq. 9)$$

$$v \text{ offset} = 0 \quad (eq. 10)$$

The rectangle coordinates for the current frames 20 are then calculated using equations 10–12 below:

$$\text{upper left} = (u,v) \quad (eq. 11)$$

$$\text{upper right} = (u+macrobloc\_width/surface\_length, v) \quad (eq. 12)$$

$$\text{lower left} = (u+macrobloc\_width*macrobloc\_height/surface\_length, v) \quad (eq. 13)$$

$$\text{lower right} = (u+macrobloc\_width/surface\_length+macrobloc\_width*macrobloc\_height/surface\_length, v) \quad (eq. 14)$$

Figure 5B:
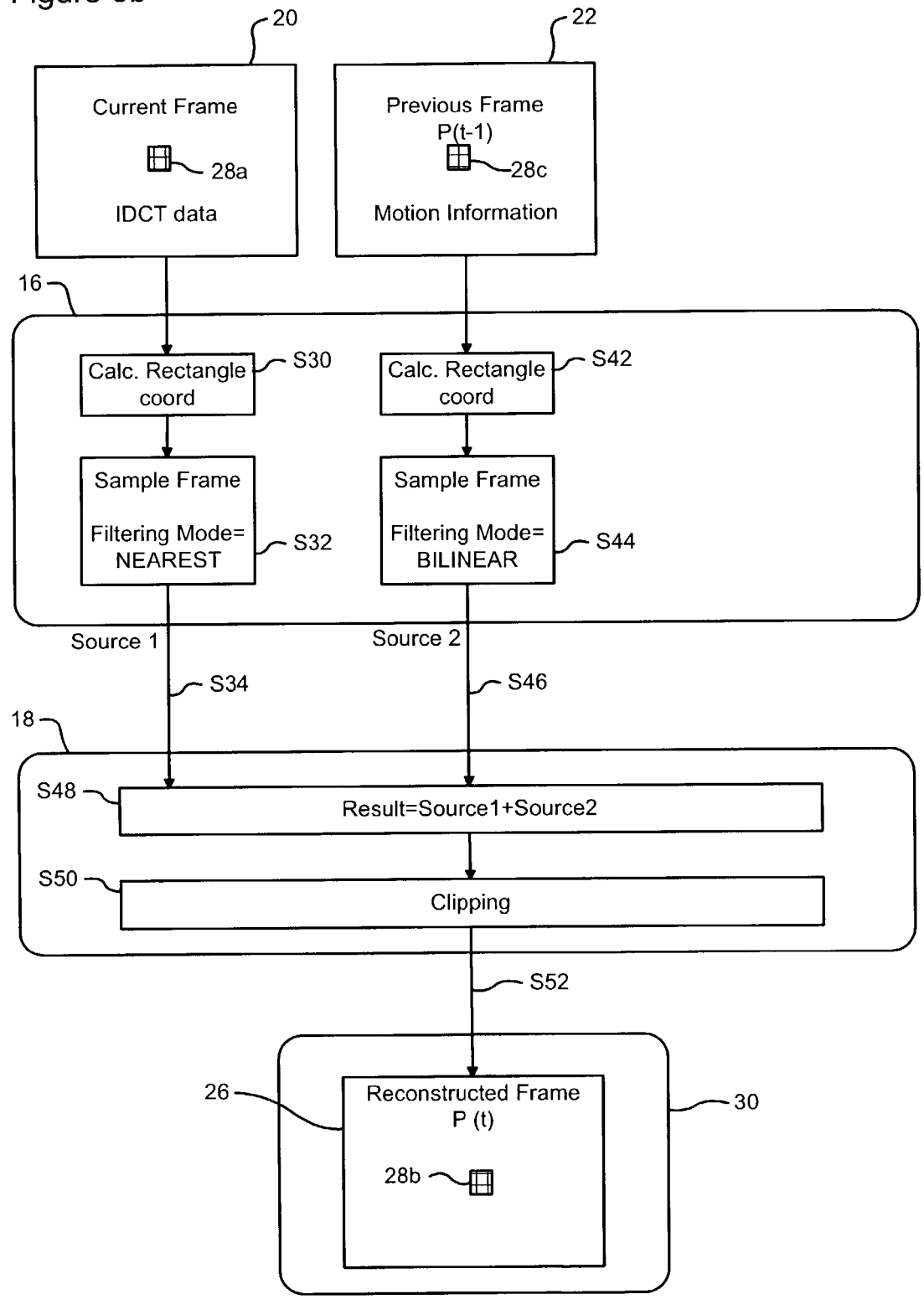

As shown in FIG. 5b, a P-block can be constructed from the addition of an error block and a previous block. Hence the frame 20 and 22 macroblocks are used. The figure illustrates the principle operations performed by the shared resources of the GPU 8 to reconstruct a current P-type block P(t) 30, based on current frame 20 IDCT (image texture) data, and motion vector information from 22. As described above, the reconstructed frame 26 is assembled in memory 30 one macroblock 28 at a time. Each macroblock is sampled for respective macroblocks 28a and 28c, using the texture engine 16. The sampled macroblocks are then merged using the pixel shader 18, and the blended macroblock 28b saved to memory 30 to assemble the reconstructed frame 26. These processes are described in greater detail below.

Rectangle coordinates are calculated for the current frame 20 and reconstructed frame 26 (step S30); the current frame 20 sampled (step S32); and the sampled macroblock 28a forwarded to the pixel shader 18 (step S34), all as described above with reference to FIG. 5b. For each of the macroblocks in previous frame 22, respective rectangle coordinates are also calculated for corresponding macroblocks 28c (at step S42). The x,y coordinates of each macroblock 28c is calculated using equations 1 and 2 above. For the purposes of the previous frame 22, these macroblocks 28c must include motion vector information (step S42) (e.g. in the form of (x1,y1)) for previous frame 22 in addition to IDCT data. The general equations for both u and v offsets, including motion vectors and half-pel precision capabilities, are (for previous frame 22) as follows:

$$u \text{ offset} = float (((x+(x\frac{1}{2}))/ \text{ frame width}) \quad eq. 15)$$

$$v \text{ offset} = float (((y+(y\frac{1}{2}))/ \text{ frame\_height}) \quad (eq. 16)$$

These offsets can be used to calculate the appropriate rectangle coordinates in each macroblocks of the previous frame 22, in accordance with equations 17–20 below. These rectangle coordinates define the square area within which the image data of the frames 22 is sampled to obtain the motion vector information of the involved macroblocks 28c.

$$\text{upper left} = (u,v) \quad (eq. 17)$$

$$\text{upper right} = (u+macrobloc\_width/picture\_width, v) \quad (eq. 18)$$

$$\text{lower left} = (u, v+macrobloc\_height/picture\_width) \quad (eq. 19)$$

$$\text{lower right} = (u+macrobloc\_width/picture\_width, v+macrobloc\_height/picture\_width) \quad (eq. 20)$$

Following calculation of rectangle coordinates, motion vector information of each of the previous frame 22 is sampled, using a "Bilinear" filter (at step S44), which has half-pel precision. The sampled macroblocks 28c (now containing sampled image data) are forwarded (at S46) to the pixel shader 18 for further processing.

A conventional pixel shader 18 is designed to blend a given number of surfaces (frames) in parallel. In order to generate the reconstructed frame 26 only two surfaces need to be blended, macroblocks 28 of all two frames 20,22 can be processed simultaneously. As shown in FIG. 5b, the sampled macroblocks 28 (forwarded from the texture engine 16 at S34 and S46) are blended (at S48) by adding the current frame 20 IDCT data to the previous frame 22 motion vector information. This blending step (S48) merges the two macroblocks 28a,c into a single reconstructed macroblock 28b of the reconstructed frame 26. If necessary, the summation result can be clipped S50 to provide a valid color range (e.g. of 16–240) of the reconstructed macroblock 28b. The pixel shader 18 then writes the reconstructed macroblock 28b to memory 30 (at S52) to assemble the reconstructed frame 26 in preparation for display.

A P-block can also be constructed only from the previous frame information. In this case the error surface is not used, and the pixel shader operation (S48) has the following equation:

$$\text{Result} = \text{Source2} \qquad (\text{eq. 21})$$

Figure 5C:
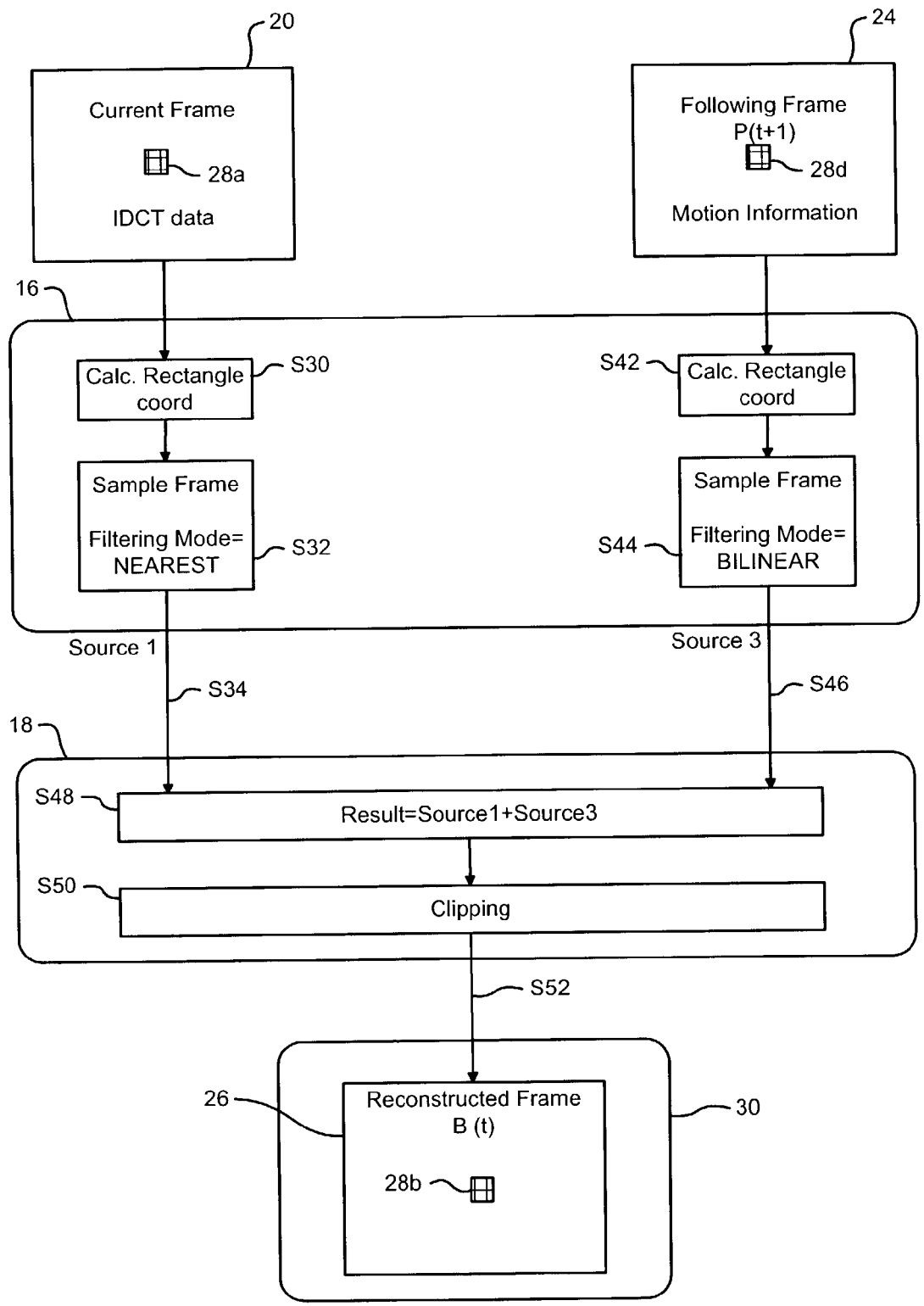

As specified in FIG. 5c, in cases where the current frame 30 is a single direction B-type frame, generation of the reconstructed frame 26 is based on IDCT (image texture) data of the current frame 20 and motion vector data of the following frame 24 only. In this case, both the current and following frames are sampled as described above, and blended (at S48) by simply adding the motion vector data of macroblock 28d to the image texture data of macroblock 28a.

Figure 5D:
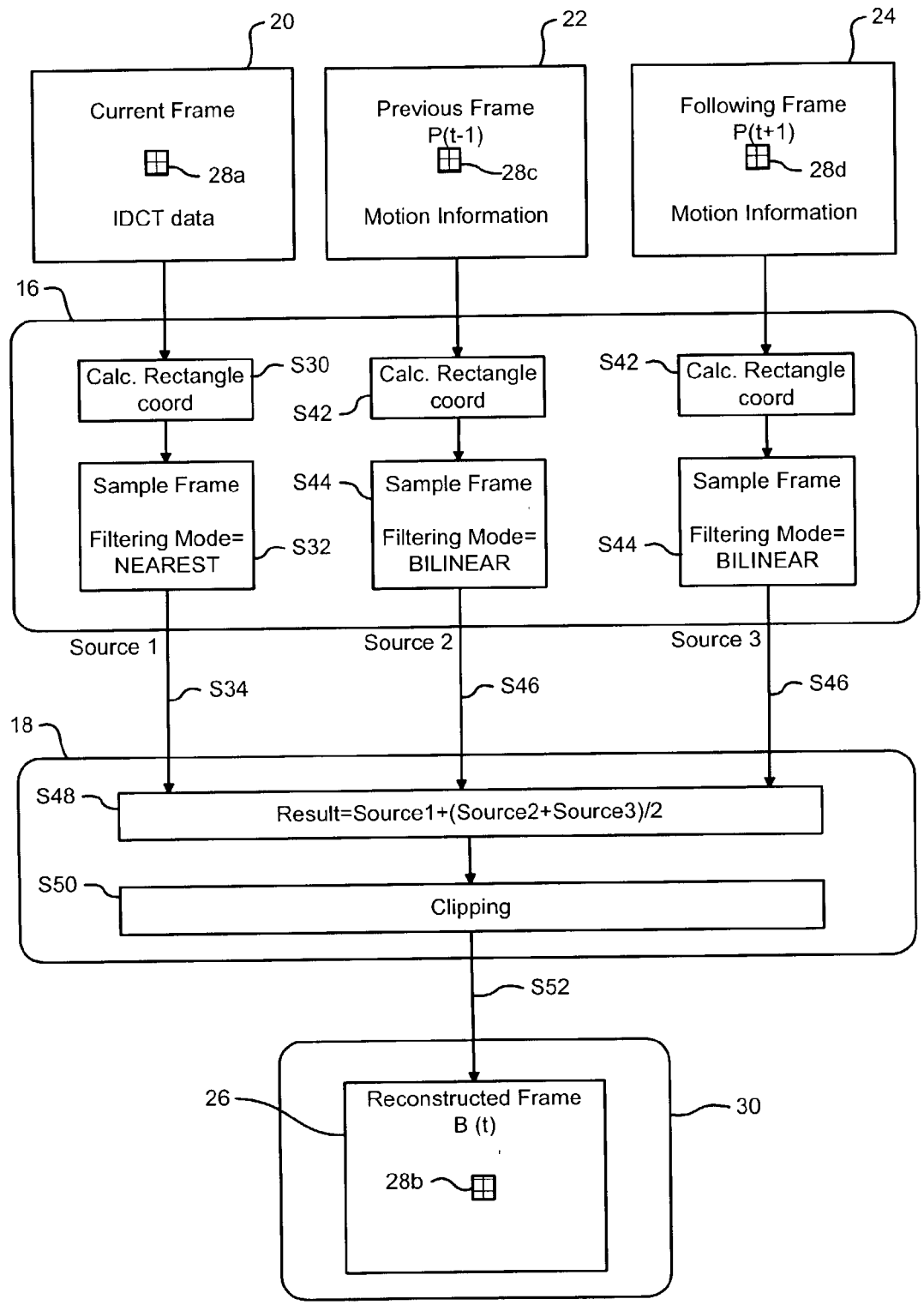

FIG. 5d shows the case for a bi-directional B-block. The main difference from previous demonstration consists of generating the frame 30 from the input frames 20, 22 and 24. The macroblocks 28c,d must include motion vector information (step S42) (e.g. in the form of (x1,y1) for previous frame 22 and (x2,y2) for the following frame 24). The operation of the pixel shader (S48) consists of performing a blending operation of both the previous and following macroblock pixels using equation 22.

$$\text{Result} = \text{Source1} + (\text{Source2} + \text{Source3})/2 \qquad (\text{eq. 22})$$

As is well known in the art, an interlaced formatted frame uses two fields (e.g. a top field and a bottom field) to convey a complete image frame. For a non-interlaced field format, both fields can be processed independently, following the same steps described above with reference to FIG. 4. Thus a two-pass process can be used, in which each field is processed, in turn, and written to memory 30. The two fields can conveniently be combined, in memory 30, during writing of the second field.

For an interlaced field format, a three pass process can be used, in which both fields are first extracted from the input frame, these fields are then process independently, and finally both results are combined into a final interlaced field format.

The extraction of the top interlaced field consists of sampling the provided input frame using a "Nearest" filtering, scaling by half in the vertical direction, and forwarding the result to respective memory location. The extraction of the bottom interlaced field consists of offsetting the input frame by one line, sampling the frame using a "Nearest" filtering, scaling by half in the vertical direction, and forwarding the result to a second memory location.

The motion compensation on both top and bottom field can be processed separately using the method outlined in FIG. 4.

The interlacing of two resulting motion compensated fields into a single output frame is generated with the help of a "key". This key can be a 3d command, an additional texture, a pixel shader color index counter or a specific pixel shader operation.

Figure 6:
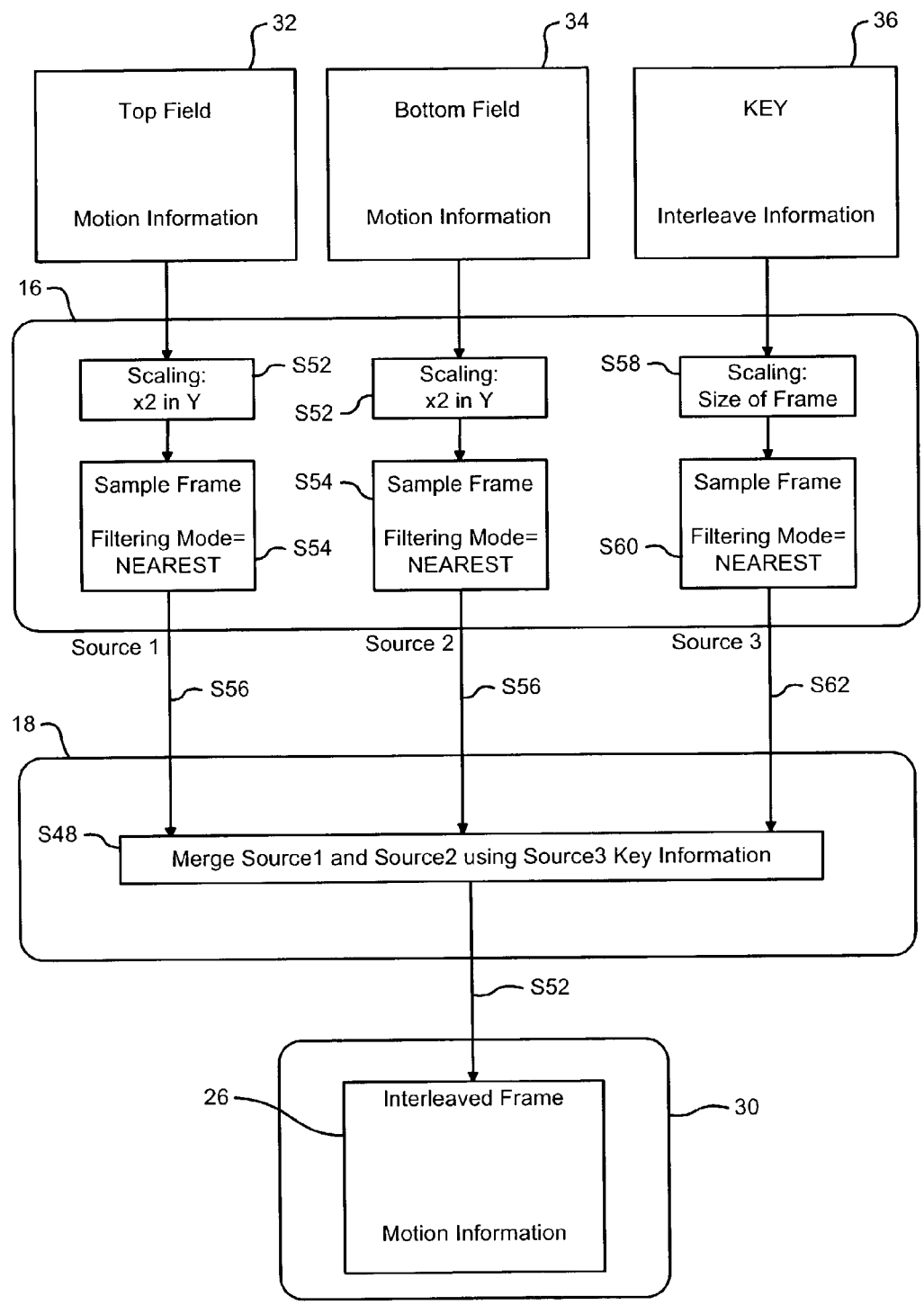
FIG. 6 show principle steps in a motion compensation process applied to interlaced field formatted image data, in accordance with an embodiment of the present invention.

FIG. 6, show a top field 32, and a bottom field 34. For the steps S54, each field is sampled using the "Nearest" filtering (at S52) and scaled by 2 (i.e. double) in the vertical direction; and then forwarded to the pixel shader 18 (at S48).

For the purposes of merging the top and bottom, the key 36 is provided as a texture, with the value of each bit indicating whether a value should be sampled from source 1 or source 2. In order to ensure an appropriate amount of key information is available to complete the merge, the key 36 is sampled using "Nearest" filtering (at S60); scaled to the size of the frame 26 (at S62); and then forwarded to the pixel shader 18 (at S48).

Within the pixel shader 18, the two sources are merged (at S48) by sampling pixels from each source in accordance with the key 36. In this case, the key 36 operates to select lines 1, 3, 5 . . . etc. (containing the top field information) from source 1, and lines 2, 4, 6 . . . etc. (containing the bottom field information) from source 2. This selection sequence yields a single merged frame 26, containing both fields in an interlaced manner.

Figure 7:
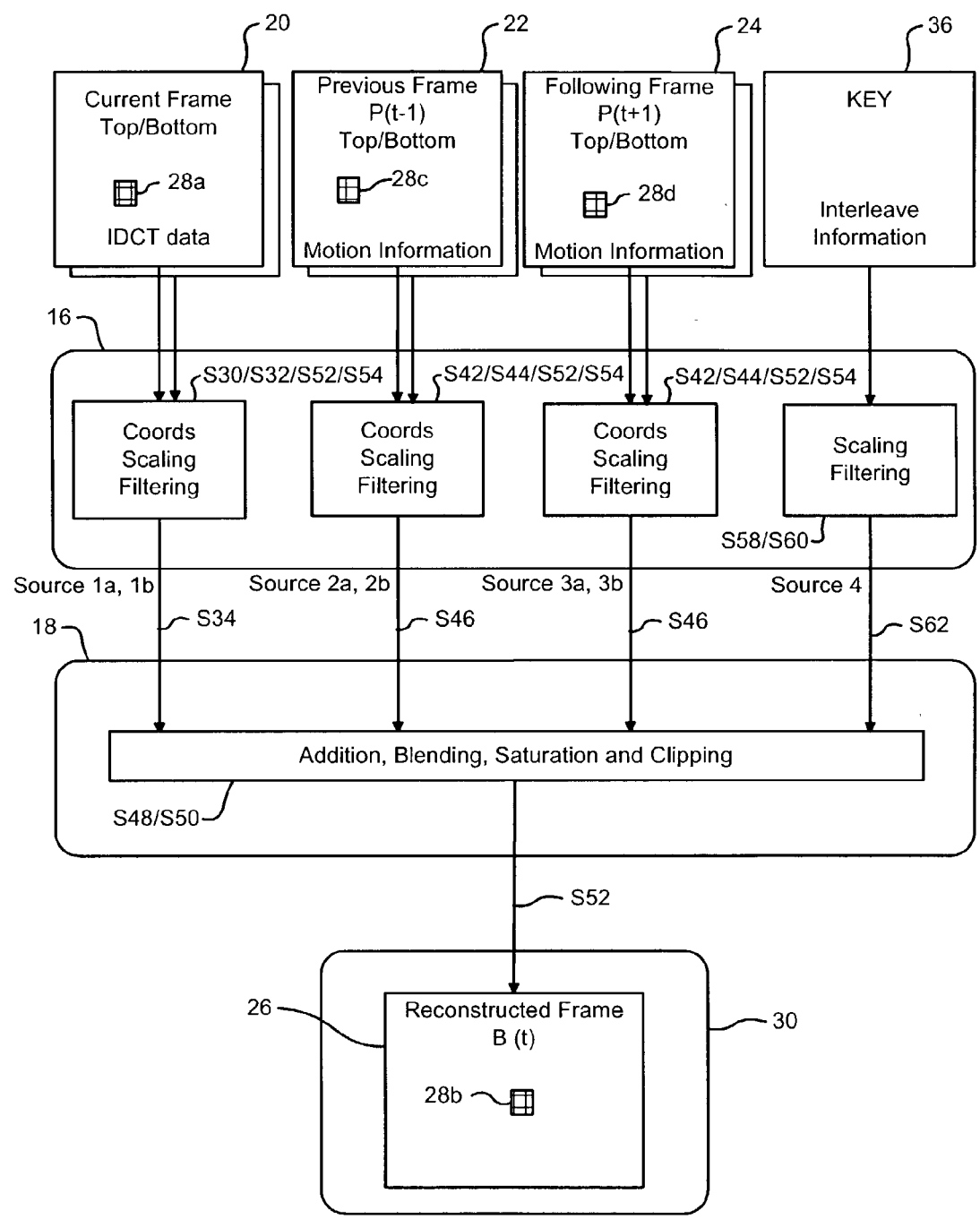
FIG. 7 show principle steps in a motion compensation process applied with cascading merge of interlaced field formatted image data, in accordance with an embodiment of the present invention.

Another method for reconstructing a complete image frame from two interlaced fields consists of using a cascading merge (or blending) operation. FIG. 7, shows this technique used in combining the motion compensated reconstructed method with the field extraction method outlined previously.

An important point of the cascading merge concerns the vertical half-pel sampling. This operation is performed by a pixel shader instruction instead of a filtering mode. This is required since the filtering method would occur on consecutive (top and bottom) field instead of only the top field information. Also the calculation of rectangle offset for the top field is taken from equation 23 and 24.

$$u \text{ offset} = \text{float}((x + (x^{1/2}))/\text{frame\_width}) \qquad \text{eq. 23}$$

$$v \text{ offset} = \text{float}((y + \text{int}(y^{1/2}))/\text{frame\_height}) \qquad (\text{eq. 24})$$

While the bottom field gets processed by using macroblock having the same rectangle values offset by 2 lines. This is done by finding the u,v coordinates using equations 25 and 26.

$$u \text{ offset} = \text{float}((x + (x^{1/2}))/\text{frame\_width}) \qquad (\text{eq. 25})$$

$$v \text{ offset} = \text{float}((y + \text{int}(y^{1/2}) + 2)/\text{frame\_height}) \qquad (\text{eq. 26})$$

For the present invention the term "rectangle" can be represented as a sprite, a quad or two triangles.

In general, the number of steps required to generate the reconstructed frame 26 is directly related to the number of surfaces (i.e. frames or fields) that must be processed by the pixel shader 18. In principle, the whole cascading process can be done in one pass, if the pixel shader 18 is designed to process at least seven surfaces (one for the key 36, and two surfaces for each of the current 20, previous 22 and following frames 24) in parallel.

The embodiment(s) of the invention described above is (are) intended to be exemplary only. The scope of the invention is therefore intended to be limited solely by the scope of the appended claims.

We claim:

1. A method of motion compensation within a displayable video stream using shared resources of a Graphics Processor Unit (GPU), the method comprising the steps of:
   receiving image data comprising a sequential series of image frames including any one or more of: frame-type information; image texture information; and motion vector information;
   analyzing at least a current image frame; and
   controlling the shared resources of the GPU to generate a motion compensated image frame corresponding to the current image frame, using one or more GPU commands; wherein said controlling the shared resources of the GPU comprises a step of controlling a pixel shader of the GPU to saturate and clip the image texture information on a macroblock.

2. A method as claimed in claim 1, wherein the image data comprises decrypted MPEG image data received from a CODEC.

3. A method as claimed in claim 2, wherein the step of receiving the image data comprises a step of converting each frame to a spatial coordinate system.

4. A method as claimed in claim 1, wherein the step of analyzing at least a current image frame comprises a step of determining any one or more of:
   a frame type of the current image frame; and
   a field format of at least the current image frame.

5. A method as claimed in claim 4, wherein the step of controlling the shared resources of the GPU comprises a stop of controlling a texture engine of the GPU to sample at least one of the current image frame; a previous image frame; and a following image frame.

6. A method as claimed in claim 5, wherein the step of controlling the texture engine to sample at least one of the previous, current and following image frames comprises, for each frame, steps of:
   controlling the texture engine to calculate coordinates of a respective rectangle delimiting the macroblock within the respective frame; and
   controlling the texture engine to sample the respective frame within the rectangle to generate the macroblock.

7. A method as claimed in claim 6, wherein the texture engine is controlled to sample the respective frame using a selected one of a single-pel and a half-pel filtering modes.

8. A method as claimed in claim 5, wherein, when the current image frame is determined to be an intra-coded frame type (I-Frame), the texture engine is controlled to sample only the current image frame.

9. A method as claimed in claim 5, wherein, when the current image frame is determined to be a Predictive coded frame type (P Frame), the texture engine is controlled to sample the current image frame and a previous image frame to generate respective current and previous macroblocks.

10. A method as claimed in claim 9, wherein the texture engine is controlled to sample image texture information of the current image frame, and motion vector information of the previous image frame.

11. A method as claimed in claim 10, wherein, when the determined field format is an interlaced field format, the texture engine is controlled to sample each field of the previous image frame to generate first and second macroblocks of sampled field data, each macroblock including valid motion vector information of a respective one of the interlaced fields.

12. A method as claimed in claim 11, wherein the step of controlling shared resources of the GPU comprises a further step of controlling the pixel shader of the GPU to sample the valid motion vector information of each of the first and second macroblocks to generate a single merged macroblock including valid motion vector information of both of the interlaced fields.

13. A method as claimed in claim 9, wherein the step of controlling the shared resources of the GPU comprises a further step of controlling the pixel shader of the GPU to blend the respective macroblocks of the current and previous image frames.

14. A method as claimed in claim 13, wherein the pixel shader is controlled to blend the respective macroblocks by adding the respective macroblocks of the current and previous image frames.

15. A method as claimed in claim 5, wherein, when the current image frame is determined to be a Bi-directionally predictive coded frame type (B Frame), the texture engine is controlled to sample respective portions of each one of a previous image frame, the current image frame and a following image frame to generate respective previous, current and following macroblocks.

16. A method as claimed in claim 15, wherein the texture engine is controlled to sample image texture information of the current image frame, and motion vector information of each of the previous and following image frames.

17. A method as claimed in claim 16, wherein, when the determined field format is an interlaced field format, the texture engine is controlled to:
   sample each field of the previous image frame to generate a respective pair of previous frame macroblocks, each previous frame macroblock including valid motion vector information of a respective one of the interlaced fields of the previous frame; and
   sample each field of the following image frame to generate a respective pair of following frame macroblocks, each following frame macroblock including valid motion vector information of a respective one of the interlaced fields of the following frame.

18. A method as claimed in claim 17, wherein the step of controlling shared resources of the GPU comprises further steps of:
   controlling the pixel shader of the GPU to sample the valid motion vector information of each of the previous frame macroblocks to generate a first blended macroblock including valid motion vector information of both of the interlaced fields of the previous frame; and
   controlling the pixel shader to sample the valid motion vector information of each of the following frame macroblocks to generate a second blended macroblock including valid motion vector information of both of the interlaced fields of the following frame.

19. A method as claimed in claim 15, wherein the step of controlling the shared resources of the GPU comprises a further step of controlling the pixel shader of the GPU to blend the respective macroblocks of the current image frame and each of the previous and following image frames.

20. A method as claimed in claim 19, wherein the pixel shader is controlled to blend the respective macroblocks by:
   calculating an average of the previous and following macroblocks: and
   adding the calculated average to the respective current macroblock.

* * * * *